(12) United States Patent
Lao et al.

(10) Patent No.: US 10,235,408 B1
(45) Date of Patent: Mar. 19, 2019

(54) USER ENROLLMENT AND VERIFICATION

(71) Applicant: MorphoTrust USA, LLC, Billerica, MA (US)

(72) Inventors: Zhiqiang Lao, Newtown, PA (US); Brian Martin, McMurray, PA (US); Brian Bertan, Merrick, NY (US)

(73) Assignee: MorphoTrust USA, LLC, Billerica, MA (US)

( * ) Notice: Subject to any disclaimer, the term of this patent is extended or adjusted under 35 U.S.C. 154(b) by 188 days.

(21) Appl. No.: 15/223,284

(22) Filed: Jul. 29, 2016

Related U.S. Application Data

(60) Provisional application No. 62/199,454, filed on Jul. 31, 2015.

(51) Int. Cl.
*G06K 9/00* (2006.01)
*G06F 17/30* (2006.01)

(52) U.S. Cl.
CPC .. *G06F 17/30371* (2013.01); *G06F 17/30256* (2013.01); *G06K 9/00013* (2013.01); *G06K 9/00228* (2013.01); *G06K 9/00604* (2013.01)

(58) Field of Classification Search
CPC ........ G06F 17/30371; G06F 17/30256; G06K 9/00013; G06K 9/00228; G06K 9/00604
See application file for complete search history.

(56) References Cited

U.S. PATENT DOCUMENTS

| | | | | |
|---|---|---|---|---|
| 7,362,210 B2 * | 4/2008 | Bazakos | ............ | G06K 9/00228 340/10.1 |
| 8,380,243 B2 * | 2/2013 | Zhang | ................... | H04W 88/06 370/338 |
| 2004/0100363 A1 * | 5/2004 | Lane | ..................... | G06K 19/025 340/5.86 |
| 2005/0218219 A1 * | 10/2005 | Sano | ........................ | G06K 1/121 235/383 |
| 2005/0220326 A1 * | 10/2005 | Sim | ....................... | G06Q 20/341 382/118 |
| 2013/0155876 A1 * | 6/2013 | Potra | ..................... | H04W 36/14 370/248 |
| 2013/0257869 A1 * | 10/2013 | Lao | ......................... | G06T 15/08 345/424 |
| 2015/0029216 A1 * | 1/2015 | Martin | ............... | G06K 9/00228 345/626 |
| 2015/0030213 A1 * | 1/2015 | Martin | ............... | G06K 9/00234 382/118 |
| 2016/0070743 A1 * | 3/2016 | Myslinski | .......... | G06Q 30/0255 707/690 |
| 2016/0154991 A1 * | 6/2016 | Berini | ..................... | G06F 21/32 382/116 |
| 2017/0046767 A1 * | 2/2017 | Xiao | ........................ | G07G 1/00 |

OTHER PUBLICATIONS

Jain et al., "Can soft biometric traits assist user recognition?" in Proc. of SPIE, vol. 5404, pp. 561-572 (2004).
Jain et al., "Soft Biometric Traits for Personal Recognition Systems," in Proc ICBA, pp. 731-738 (2004).
Henry T.F. Rhodes, "Alphonse Bertillon: Father of Scientific Detection", Abelard-Schuman, New York, Greenwood Press, 1956.

\* cited by examiner

*Primary Examiner* — Mia M Thomas
(74) *Attorney, Agent, or Firm* — Fish & Richardson P.C.

(57) ABSTRACT

Identifying information about an individual is obtained. Soft biometrics information about the individual is generated using the identifying information. An identity record associated with the individual is populated with the soft biometrics information.

22 Claims, 7 Drawing Sheets

USER ENROLLMENT AND VERIFICATION

CROSS REFERENCE TO RELATED APPLICATIONS

This application claims the benefit of priority under 35 U.S.C. § 119(e) of U.S. Provisional Application No. 62/199,454, filed on Jul. 31, 2015, and entitled "User Enrollment and Verification," which is incorporated herein by reference in its entirety.

TECHNICAL FIELD

The following disclosure relates generally to enrolling and verifying users.

BACKGROUND

Some systems authenticate users at enrollment using biometric information. For example, state motor vehicle departments may obtain facial images and fingerprints of drivers at the time of providing driver's licenses. Some systems verify enrolled users using biometric information. For example, a driver may have to provide fingerprints when she attempts to renew her driver's license. The motor vehicle department may compare the provided fingerprint to stored database records before renewing the driver's license.

SUMMARY

The following disclosure describes techniques for using soft biometrics information to pre-populate demographic data about users while enrolling users in a system. The techniques may verify identifying information manually entered by users by comparing the manually entered information to soft biometrics information. The soft biometrics information may be extracted automatically from facial images or other suitable characteristics of the users.

The following disclosure also describes techniques for using biometric identifiers of users to obtain demographic information about the users for populating form fields. The techniques use the biometric identifiers to retrieve identifying information about users from a database. The demographic information about the users are extracted from the retrieved identifying information.

In a general aspect, identifying information about an individual is obtained. Soft biometrics information about the individual is generated using the identifying information. An identity record associated with the individual is populated with the soft biometrics information.

Particular implementations may include one or more of the following features. In some implementations, manually entered identity data about the individual may be received. A determination may be made whether the manually entered identity data corresponds to the soft biometrics information. Based on a determination that the manually entered identity data corresponds to the soft biometrics information, the manually entered identity data may be accepted, including storing the soft biometrics information and the manually entered identity data in the identity record associated with the individual.

In some implementations, manually entered identity data about the individual may be received. A determination may be made whether the manually entered identity data corresponds to the soft biometrics information. Based on a determination that the manually entered identity data does not correspond to the soft biometrics information, an alert may be provided to a user indicating that the manually entered identity data does not correspond to the soft biometrics information.

A biometric identifier associated with the individual may be received. Receiving the biometric identifier may include one or more of performing a scan of an eye of the individual, or performing a scan of a fingerprint of the individual. An identity record that corresponds to the biometric identifier may be retrieved from a database. The information included in the identity record may be compared to the soft biometrics information. Based on the comparison, a determination may be made whether the identity record matches the soft biometrics information.

Obtaining identifying information about the individual may comprise obtaining an image of the individual. Obtaining identifying information about the individual may comprise obtaining a voice sample of the individual.

The identifying information about the individual may include a name of the individual or an address of the individual. Generating the soft biometrics information about the individual may comprise determining one or more of gender, race, ethnicity or age of the individual based on the name or the address of the individual.

Generating the soft biometrics information about the individual may comprise automatically extracting soft biometrics information about the individual from the obtained identifying information using one or more algorithms that employ feature estimation based on matching scores.

Generating the soft biometrics information may comprise determining, from the obtained identifying information, one or more of demographic or physical characteristics of the individual. The demographic or physical characteristics of the individual may include one or more of gender, race, ethnicity, age, height, weight, eye color or hair color of the individual. Manually entered identity data about the individual may be received. Demographic or physical characteristics of the individual may be obtained from the manually entered identity data. A determination may be made whether the demographic or physical characteristics obtained from the manually entered data match the demographic or physical characteristics determined from the identifying information.

In another general aspect, biometric information about an individual is obtained. Identifying information that corresponds to the biometric information is retrieved from a database using the biometric information. Demographic information is extracted from the identifying information. An identity record associated with the individual is populated with the demographic information extracted from the identifying information.

Particular implementations may include one or more of the following features. Manually entered data about the individual may be obtained. A determination may be made whether the demographic information corresponds to the manually entered data. In some implementations, based on a determination that the demographic information corresponds to the manually entered data, the identity record associated with the individual may be populated with the demographic information extracted from the identity record and the manually entered data. In some implementations, based on a determination that the demographic information does not correspond to the manually entered data, an error condition may be generated.

Obtaining the biometric information about the individual may comprise obtaining biometric information based on one or more of performing a scan of a facial image of an individual, performing a scan of an eye of the individual, or performing a scan of a fingerprint of the individual.

Additional identifying information about the individual may be obtained. Soft biometrics information about the individual may be generated using the additional identifying information. A determination may be made whether the demographic information corresponds to the soft biometrics information. Based on a determination that the demographic information corresponds to the soft biometrics information, the identity record may be populated with the demographic information. The identity record may be further updated with the soft biometrics information.

Obtaining the additional identifying information about the individual may comprise one or more of obtaining an image of the individual, or obtaining a voice sample of the individual. Generating the soft biometrics information about the individual may comprise automatically extracting soft biometrics information about the individual from the additional identifying information using one or more algorithms that employ feature estimation based on matching scores.

Generating the soft biometrics information may comprise determining, from the additional identifying information, one or more of demographic or physical characteristics of the individual. The demographic or physical characteristics of the individual may include one or more of gender, race, ethnicity, age, height, weight, eye color or hair color of the individual.

Determining whether the demographic information corresponds to the soft biometrics information may comprise obtaining demographic or physical characteristics of the individual from the identifying information retrieved from the database. A determination may be made whether the demographic or physical characteristics obtained from the identifying information retrieved from the database match the demographic or physical characteristics determined from the additional identifying information.

Implementations of the above techniques include methods, systems, computer program products and computer-readable media. One such computer program product is suitably embodied in a non-transitory machine-readable medium that stores instructions executable by one or more processors. The instructions are configured to cause the one or more processors to perform the above-described actions. One such computer-readable medium stores instructions that, when executed by a processor, are configured to cause the processor to perform one or more of the above described actions. One such system includes one or more processors and a storage device storing instructions that, when executed by the one or more processors, cause the one or more processors to perform the above-described actions.

The details of one or more disclosed implementations are set forth in the accompanying drawings and the description below. Other features, aspects, and advantages will become apparent from the description, the drawings and the claims.

DETAILED DESCRIPTION

Figure 1A:
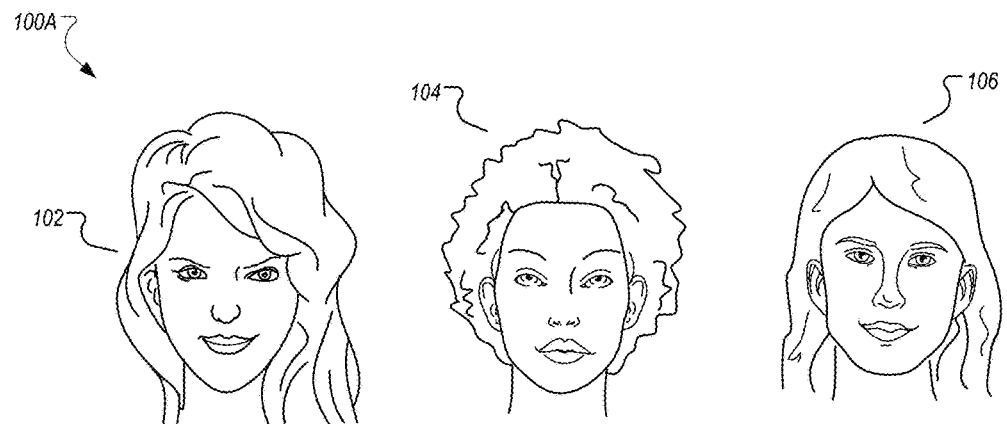
FIGS. 1A and 1B illustrate examples of determining soft biometrics of individuals.

Systems that provide biometric recognition and/or verification for verifying particular characteristics of an individual, such as an individual's identity, age, ethnicity, criminal history, or some other suitable characteristic, are based on system users undergoing enrollment in the system. During an enrollment procedure, a user typically presents information verifying the user's identity, such as documents that attest to her true identity, and scans of one or more biometric identifiers. Once a user is enrolled into the system, biometric information about the user may be presented in subsequent transactions to recognize or verify the user and to indicate to the system that this user has undergone enrollment. Accordingly, after enrollment, the user may be authorized to conduct transactions in the system.

In this context, biometric identifiers, which are also referred to as hard biometrics, are distinctive, measurable characteristics of an individual that may be used to uniquely label and describe the individual. Biometric identifiers may be categorized as particular physiological characteristics related to the individual's body. Examples of biometric identifiers include, but are not limited to, fingerprint, palm veins, face recognition, DNA, palm print, iris recognition, and retina patterns, among others.

Current methods of enrolling users in biometric systems is dependent on users initiating enrollment into the system by providing one or more pieces of identifying information. As designed and implemented, enrollment may be an involved process that may require a new user to fill out forms, take photos, scan fingerprints, etc. The enrollment procedure may be of a prolonged duration and have a negative impact on the user's experience.

It may be useful to implement techniques that reduce the time expended in an enrollment procedure and thereby improve the user experience. Such techniques may incorporate soft biometrics information in the enrollment procedure. In this context, soft biometrics refer to a set of characteristics that provide some biometric information about a person, but are not able to individually authenticate the person, mainly due to lack of distinctiveness and permanence. Soft biometrics therefore may be distinguished from the biometric identifiers noted above, which can uniquely identify individuals. Examples of soft biometrics include a user's gender, age, height, weight, hair color or texture, eye color, race or ethnicity, among others.

Current enrollment systems include one or more biometric modalities, i.e., record one or more biometric identifiers about users as part of their identities. Incorporating soft biometrics into such systems may increase system reliability. Soft biometric features reveal biometrical information of individuals, and, in some implementations, may be derived from primary biometric identifiers. Soft biometrics may be easily captured. Their acquisition does not require enrollment since training can be performed in advance on individuals out of the specific authentication group. Additionally, soft biometric features may be computed in a resource-efficient manner, e.g., from lower quality images.

Soft biometrics information may be useful in providing pre-processing for biometric enrollment, providing automatic or companion verification in biometric enrollment, narrowing down the search within a group of candidate individuals for biometrical recognition, among other uses. Soft biometrics also may be used to verify information manually entered by users during enrollment, and thereby reduce errors associated with human input. Accordingly, leveraging soft biometrics information may facilitate streamlined and reliable biometrics enrollment systems.

The following sections describe techniques to use soft biometrics information to augment identity records during an enrollment procedure. In some implementations, soft biometrics information may be extracted automatically from images of individuals. This information may be utilized in enrollment to auto-populate demographic data with soft biometrics information. Additionally or alternatively, the soft biometrics information may be used to validate data manually entered by users. Additionally or alternatively, the soft biometrics information may be used to verify data stored in individual records.

The following sections also describe techniques to use biometric identifiers to obtain demographic information about users from pre-stored identifying information about the users, and populating form fields using the obtained demographic information during an enrollment or verification procedure. In some implementations, demographic information that is obtained based on the biometric identifiers may be used to validate data manually entered by users. Additionally or alternatively, the demographic information may be compared with soft biometrics information.

Figure 1B:
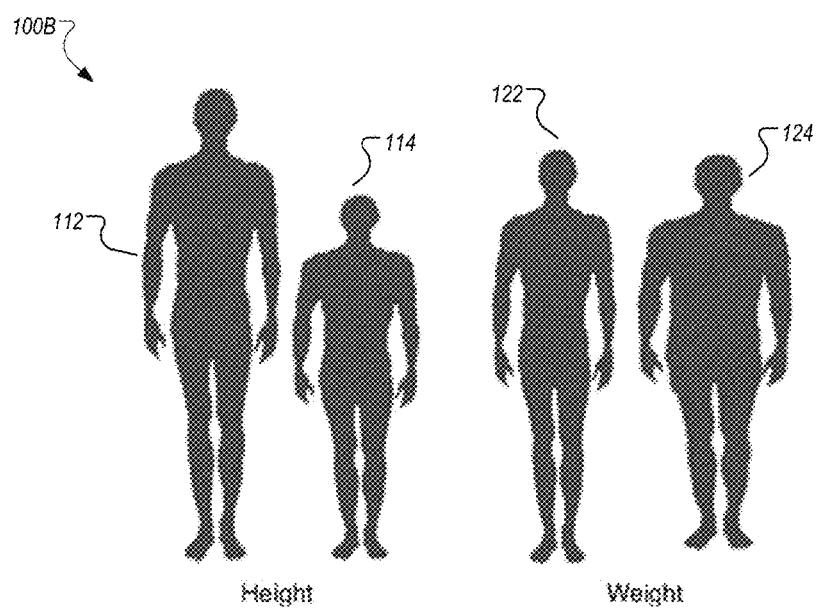

FIGS. 1A and 1B illustrate examples of determining soft biometrics of individuals. FIG. 1A shows examples of facial images 102, 104 and 106 of individuals that are captured, e.g., by a camera. From the facial images, a system can determine soft biometrics information about the individuals. For example, the system may estimate that individuals represented by images 102 and 104 are of the female gender, while an individual represented by image 106 is of the male gender. Additionally or alternatively, the system may estimate that the individuals represented by images 102 and 106 exhibit racial or ethnic features of Caucasian origin, while the individual represented by image 104 exhibit racial or ethnic features of African origin. Additionally or alternatively, the system may estimate that the individuals represented by images 102, 104 and 106 are in the 20-30 year age range.

FIG. 1B shows examples of full body images 112, 114, 122 and 124 of individuals that are captured, e.g., by a camera. From the full body images, a system may determine some soft biometrics information about the individuals. For example, the system may estimate that an individual represented by image 112 has height in a range of 6 ft, while an individual represented by image 112 has height in a range of 5 ft 5 inches. Additionally or alternatively, the system may determine that an individual represented by image 122 has a lean or athletic build, while an individual represented by image 124 has a stocky build. In some implementations, the system may estimate weight ranges of the individuals represented by the images 112, 114, 122 and 124.

While the above examples of soft biometrics may not uniquely identify an individual, they nevertheless provide useful identifying characteristics and may help augment identity records of individuals by providing information about characteristics that may not be captured by biometric identifiers. For example, while a fingerprint may match uniquely to an individual, the fingerprint in isolation may fail to indicate the individual's gender, age, race or ethnicity. Soft biometrics information extracted from an image of the individual, which may be captured in association with obtaining the fingerprint, may provide these additional information and facilitate building a more complete identity record about the individual.

Figure 2A:
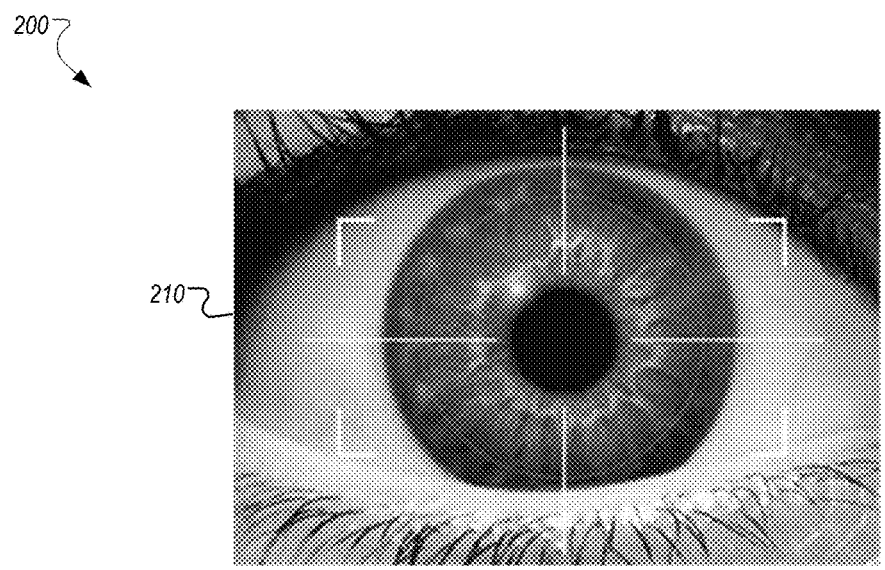
FIGS. 2A, 2B and 2C illustrate an example of an enrollment procedure that uses biometric identifiers and soft biometrics.
Figure 2B:
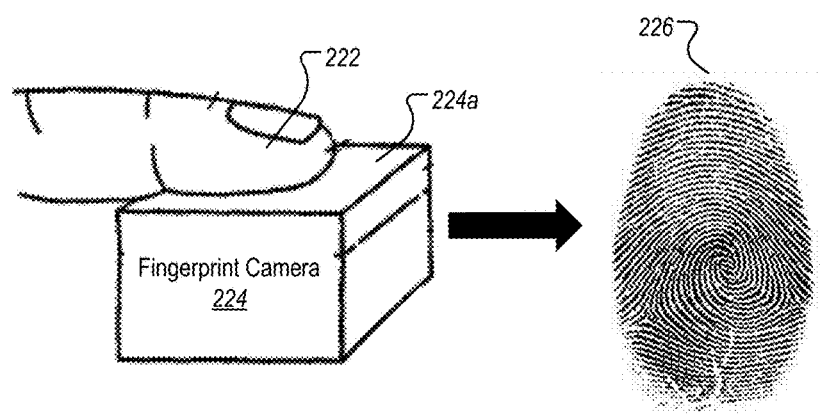
Figure 2C:
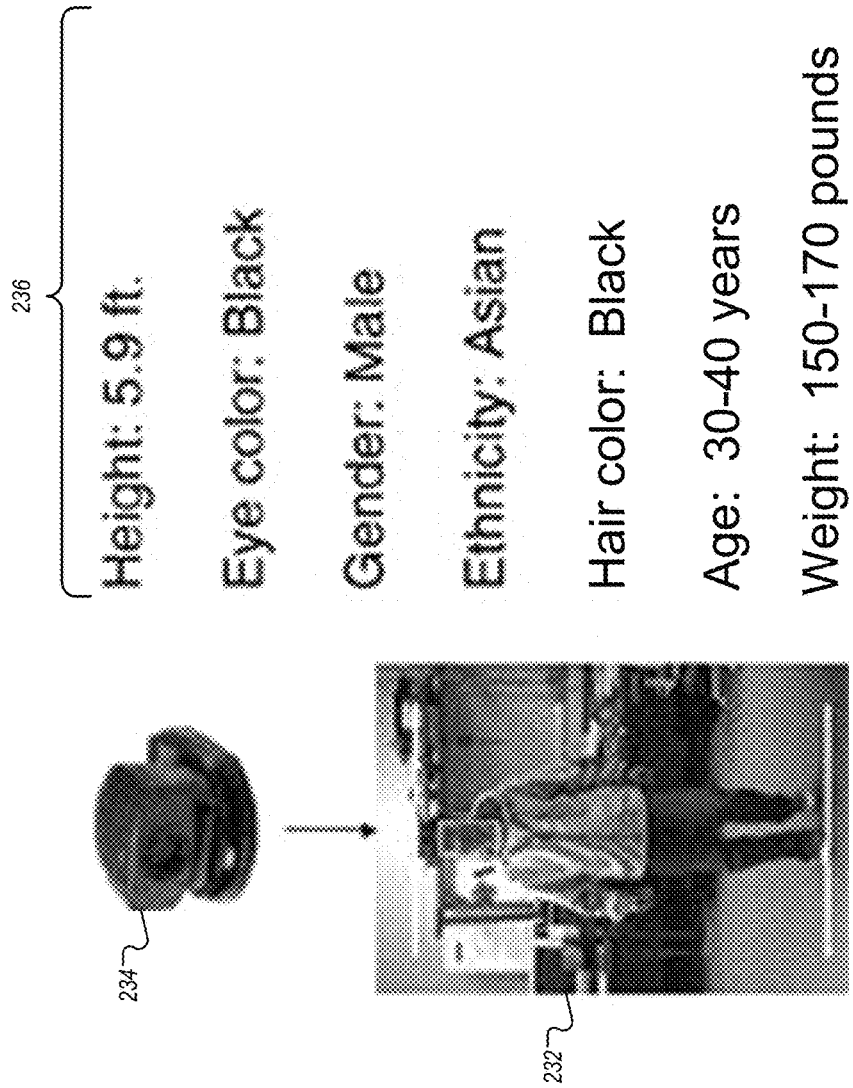

FIGS. 2A, 2B and 2C illustrate an example of an enrollment procedure 200 that uses biometric identifiers and soft biometrics. In some implementations, one or more biometric identifiers of a user are obtained while enrolling the user into an enrollment and verification system using the procedure 200. For example, a biometric identifier that is used for enrollment may be the user's iris. FIG. 2A shows an example 210 of scanning the user's iris during the enrollment procedure 200. The iris scan 210 may be performed using a suitable optical device, e.g., a camera that can scan and capture an image of the iris.

As another example, a biometric identifier that is used for enrollment may be the user's fingerprint(s). FIG. 2B shows an example of capturing a print of the user's finger 222 using a fingerprint camera 224 during the enrollment procedure 200. The fingerprint camera 224 scans the user's finger 222 that is placed on a plate 224a of the camera, and records a fingerprint 226 corresponding to the finger 222.

In addition to obtaining biometric identifiers, such as by scanning the user's iris or obtaining a fingerprint, the enrollment procedure 200 may obtain soft biometrics information of the user as part of the enrollment. For example, FIG. 2C shows that an image 232 of the user may be captured using a camera 234. In some implementations, the image 232 may be a full body image of the user, as shown. However, in other implementations, the image 232 may be a facial image of the user.

The system may examine the captured image 232 and extract soft biometrics information about the user from the image using one or more algorithms. For example, the system may determine soft biometrics information using a feature estimation process that is based on computing scores about different characteristics extracted from the image, and matching the scores with known characteristic scores. In this manner, various soft biometrics information 236 about the user may be determined, such as height, eye color, gender, ethnicity, hair color, age, or weight, among others.

In some implementations, the image 232 may be captured during a session in which the biometric identifiers about the user are obtained. However, in other implementations, the image 232 may be captured in a separate session from that in which biometric identifiers about the user are obtained. In some implementations, the image 232 may be captured without obtaining biometric identifiers about the user. For example, soft biometrics extracted from the image 232 may be used in conjunction with manually entered information, without relying on biometric identifiers.

The examples provided in this disclosure primarily describe soft biometrics information as being obtained from images. However, soft biometrics also may be obtained from sources other than images. For example, in some implementations, soft biometrics may be obtained from a video of a user. The video may provide many of the soft biometrics that can be extracted from an image, and/or may provide other soft biometrics different from those sourced from an image. In some implementations, soft biometrics may be obtained from a voice sample of a user. The voice sample may provide clues to estimate the user's gender, ethnicity, nationality, age, among other characteristics. In some cases, demographic information manually entered by a user may be used to extract soft biometrics. For example, a name provided by a user may be used as a clue in estimating the user's gender, race or ethnicity, among other characteristics.

In some implementations, during the enrollment procedure 200, an identity record of the user may be created. Relevant fields in the identity record may be automatically populated with the soft biometrics information 236. Accordingly, the enrollment procedure may be improved, since auto-populating various fields may reduce the time taken in the enrollment process, and/or prevent wrong information being manually entered into these fields due to human errors. In some implementations, other fields in the identity record may include manually entered information, such as the user's name, date of birth, social security and/or driver's license numbers, among others. The manually entered information may correspond to characteristics that may not be easily determined either from biometric identifiers or from soft biometrics information. In some implementations, the identity record also may be associated with biometric identifiers, e.g., an iris scan or a fingerprint, which may be obtained during an enrollment procedure as described above.

In some implementations, the soft biometrics information may be used to verify manually entered information. For example, the user's gender, age, or ethnicity may be estimated from the image 232. This estimation may be compared to information about the user's gender, age, or ethnicity that are manually entered, e.g., either by the user or a supervising official typing into a form during the enrollment procedure. If the estimated soft biometric does not match the manually entered information corresponding to the same feature, then an alert may be generated to warn the user or the supervising official, as the case may be, about potential errors in the manually entered information.

In the above manner, a Soft Biometrics Assisted Enrollment System (SBAES) may be built that incorporates automatically determined soft biometrics information in an enrollment process. As described above, the SBAES may include functions to auto populate soft biometrics information into demographic fields in an identity record during the enrollment process. Additionally or alternatively, the SBAES may include functions to validate manual input of data based on the soft biometrics information.

Figure 3:
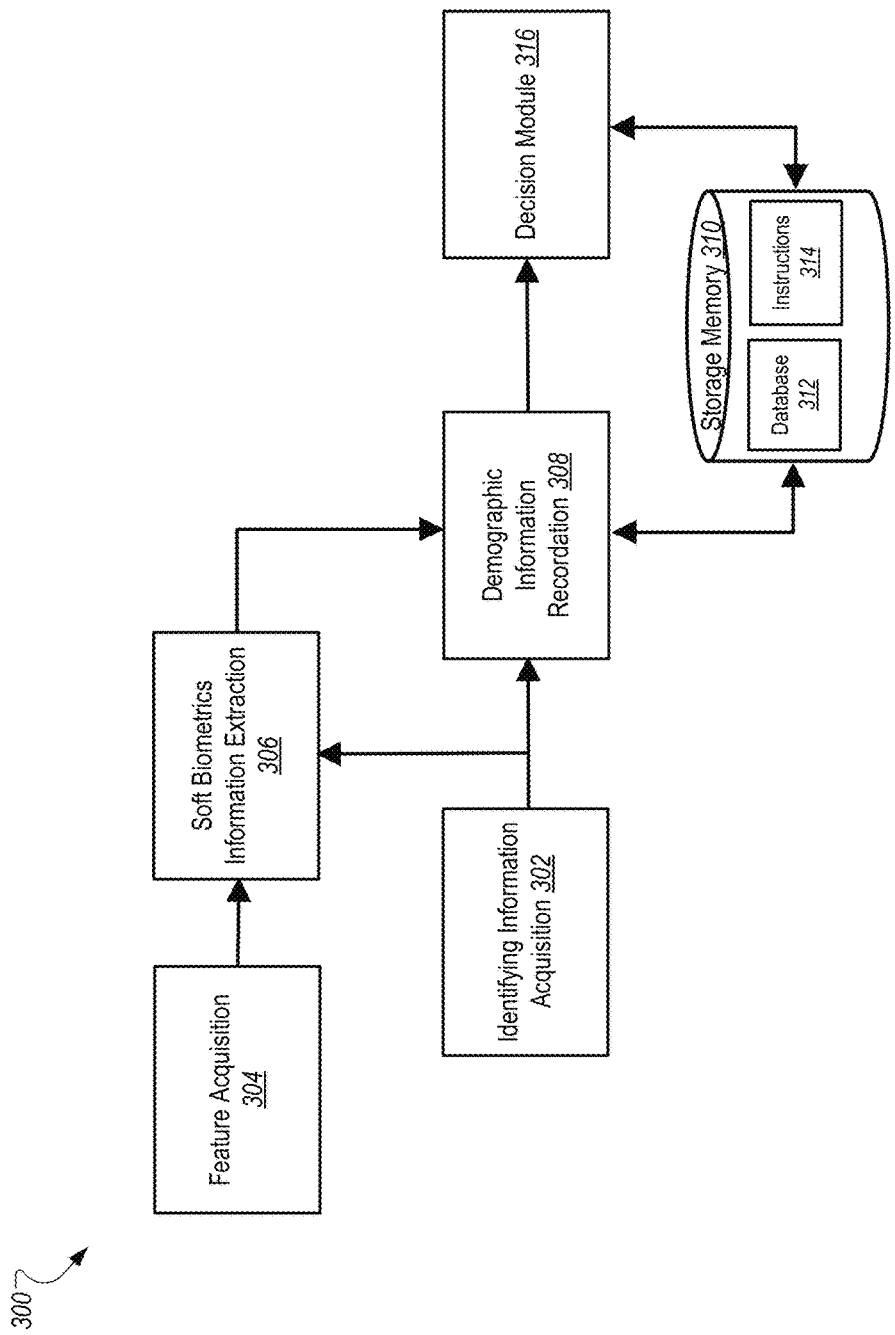
FIG. 3 illustrates a block diagram of an example system that uses soft biometrics information for user enrollment and verification.

FIG. 3 illustrates a block diagram of an example system 300 that uses soft biometrics information for user enrollment and verification. In some implementations, the system 300 may use the enrollment procedure 200 to automatically extract soft biometrics information from an image of a user and use the soft biometrics information to populate demographic information fields in an identity record of the user, and/or verify manually entered information. The system 300 may be an SBAES described above.

In the example shown in FIG. 3, the system 300 includes an identifying information acquisition module 302, a feature acquisition module 304, a soft biometrics information extraction module 306, a demographic information recordation module 308, a storage memory 310 and a decision module 316. The storage memory 310 includes a database 312 and instructions 314.

In some implementations, the system 300 may be implemented in a hardware device that incorporates all the modules shown in FIG. 3. For example, the system 300 may be a computer with a scanner, camera, or other optical input; a processor; a storage device; and input/output such as a keyboard, a mouse and a display. Alternatively, the system 300 may be a portable device (e.g., a smartphone) with a camera, a processor, on board memory, a touchscreen display that also provides input functionality, and/or additional input hardware (such as hardware buttons). In some implementations, the system 300 may include separate hardware components that are coupled to one another. For example, the system 300 may include a scanner, camera or other optical device, which is coupled to a computer with a processor, storage memory and a display. Other suitable configurations of the system 300 are also possible.

The identifying information acquisition module 302 is configured to obtain biometric identifiers of users. For example, the identifying information acquisition module 302 may obtain an iris scan 210 or a fingerprint 226 as described previously. The identifying information acquisition module 302 may include an optical component to obtain the biometric identifier(s), such as scanner, camera, or other suitable hardware, to capture images of a user's iris or fingerprint.

In some implementations, the identifying information acquisition module 302 may obtain one or more biometric identifiers of a user while enrolling the user into the system 300. In some implementations, the module 302 may obtain one or more biometric identifiers of a user, who is previously enrolled into the system 300, during a later verification process, e.g., to authorize the user to access some restricted system resources.

In some implementations, the identifying information acquisition module 302 also obtains manually entered identifying information about users. For example, as noted previously, information about a user's name, date of birth, social security or driver's license number, gender, ethnicity, among others, may be manually entered into an enrollment form by the user or by a supervising official.

In some implementations, the identifying information acquisition module 302 may determine some of these demographic characteristics from other information that is manually entered. For example, the user's gender may not be manually entered. However, the identifying information acquisition module 302 may use the name that is manually entered to estimate the user's gender. For example, if a user name that is entered is a typical male name, such as Eric or Brian, then the identifying information acquisition module 302 may estimate the user's gender to be male. Conversely, if the user name that is entered is a typical female name, such as Joyce or Hannah, then the identifying information acquisition module 302 may estimate the user's gender to be female. As another example, the user's race or ethnicity may not be manually entered. However, the identifying information acquisition module 302 may use the name that is manually entered to estimate the user's race or ethnicity. For example, if the user name that is entered is typical of a particular ethnicity, such as Juanita or Guadalupe, then the identifying information acquisition module 302 may estimate the user's ethnicity to be Hispanic. Additionally or alternatively, if the user name that is entered is typical of a particular race, such as Tyrone or Jamal, then the identifying information acquisition module 302 may estimate the user's race to be African American. As another example, the user's age may not be manually entered. However, the identifying information acquisition module 302 may use the address that is manually entered to estimate the user's age. For example, the last 4 digits of a zip code that is manually entered may include a retirement community with high probability of ages above the national average. In such a case, the identifying information acquisition module 302 may estimate that the corresponding user's age in within the range typical of the zip code, which is above the national average. In some implementations, as noted below, obtaining demographic characteristics from manually entered information may be performed by the soft biometrics information extraction module 306, in addition or as an alternative to the identifying information acquisition module 302.

In some implementations, information acquired by the identifying information acquisition module 302 is provided to a processor included in the system 300 for generating the corresponding biometric identifier. For example, the processor may execute mathematical and statistical algorithmic routines to generate and store fingerprint 226 from an image of the finger 222, or a digital template of the user's iris from the iris scan 210. The images acquired by the identifying information acquisition module 302, and/or the resulting biometric identifiers that are generated, may be stored in the database 312. The stored images may be used for enrollment and/or verification.

The feature acquisition module 304 is configured to obtain soft biometrics information of users. For example, the feature acquisition module 304 may obtain image 232 described previously. The feature acquisition module 304 may include an optical component, such as camera 234, or some other suitable hardware, to capture users' images.

An image obtained by the feature acquisition module 304 is input to the soft biometrics information extraction module 306. The soft biometrics information extraction module 306 processes the image and extracts from the image soft biometrics information about the user associated with the image. For example, the soft biometrics information extraction module 306 may extract the soft biometrics information 236 by examining the image 232.

In some implementations, the soft biometrics information extraction module 306 may use feature estimation algorithms that are based on matching scores, as noted previously. In some implementations, the soft biometrics information extraction module 306 may be implemented as one or more software or firmware routines that are executed by a processor included in the system 300.

In some implementations, the soft biometrics information extraction module 306 may receive manually entered information from the identifying information acquisition module 302 and extract soft biometrics information from this received information. For example, the soft biometrics information extraction module 306 may receive demographic information such as a user's name or address, based on which the user's gender, race or ethnicity may be estimated.

The soft biometrics information determined by the module 306 are provided as input to the demographic information recordation module 308, which may be implemented as one or more software or firmware routines that are executed by a processor included in the system 300. In some implementations, the demographic information recordation module 308 generates identity records of users during enrollment into the system 300. Additionally or alternatively, the demographic information recordation module 308 may update identity records of enrolled users, for example, during a later verification process or when some demographic information changes. In either case, the demographic information recordation module 308 prepopulates fields in the identity record with the soft biometrics information obtained from the module 306. For example, the demographic information recordation module 308 may prepopulate one or more of fields corresponding to height, eye color, gender, ethnicity, hair color, age, or weight using the soft biometrics information 236.

In some implementations, the demographic information recordation module 308 also adds manually entered information to the identity record. For example, as noted previously, the user's name, date of birth, social security number, etc. may be manually entered. The demographic information recordation module 308 may populate the corresponding fields in the identity record with this manually entered information.

In some implementations, the demographic information recordation module 308 also adds the biometric identifiers to the identity record. For example, the identifying information acquisition module 302 may provide biometric identifiers that it obtained as inputs to the demographic information recordation module 308. The latter may associate the biometric identifiers with the identity record, in addition to populating the identity record with the soft biometrics information received from the soft biometrics information extraction module 306.

In some implementations, the identity records that are generated and populated by the demographic information recordation module 308 are stored in the database 312. The demographic information recordation module 308 also may store in the database 312 the images obtained by the feature acquisition module 304. In some implementations, the database 312 may be implemented in a storage memory 310, which may include read-only memory (ROM) and/or random access memory (RAM). Additionally or alternatively, the storage memory 310 may include flash memory, magnetic or optical memory, such as hard disk drives, computer disc or digital video disc memory (CD-ROM or DVD-ROM), among others.

In some implementations, the storage memory 310 also may include instructions 314 that are executed by one or more processors associated with the system 300. The instructions 314 may encode routines corresponding to one or more of the identifying information acquisition module 302, the feature acquisition module 304, the soft biometrics information extraction module 306, the demographic information recordation module 308 and the decision module 316.

In some implementations, the decision module 316 is used to compare the soft biometrics information, which is determined by the soft biometric information extraction module, to the information obtained by the identifying information acquisition module 302. For example, the decision module may receive estimates of a user's gender, age, or ethnicity that are determined by the soft biometrics information extraction module 306. The decision module also may receive manually entered information about the user's gender, age, or ethnicity that are obtained by the identifying information acquisition module 302. For each characteristic, the decision module 316 may compare the manually entered information to that estimated by the soft biometrics information extraction module 306 for the corresponding characteristic. For example, the decision module may compare the age, gender or ethnicity information that is manually entered to, respectively, the age, gender or ethnicity estimated from the soft biometrics. If the manually entered information does not match the estimated characteristic, then the decision module 316 may generate an alert, e.g., to warn about potential errors in the manually entered information.

In some implementations, the decision module 316 may perform the comparison concurrently with populating the identity record by the demographic information recordation module 308. For example, the decision module 316 may check the manually entered information at the time of enrollment and compare this information to the soft biometrics information extracted during enrollment. If there is a discrepancy, then in some implementations the decision module 316 may control the demographic information recordation module 308 to reject the manually entered information and generate an alert notifying the user. In some implementations, the user may force entry of the manually entered information, replacing the corresponding soft biometrics information that is in conflict.

Figure 4:
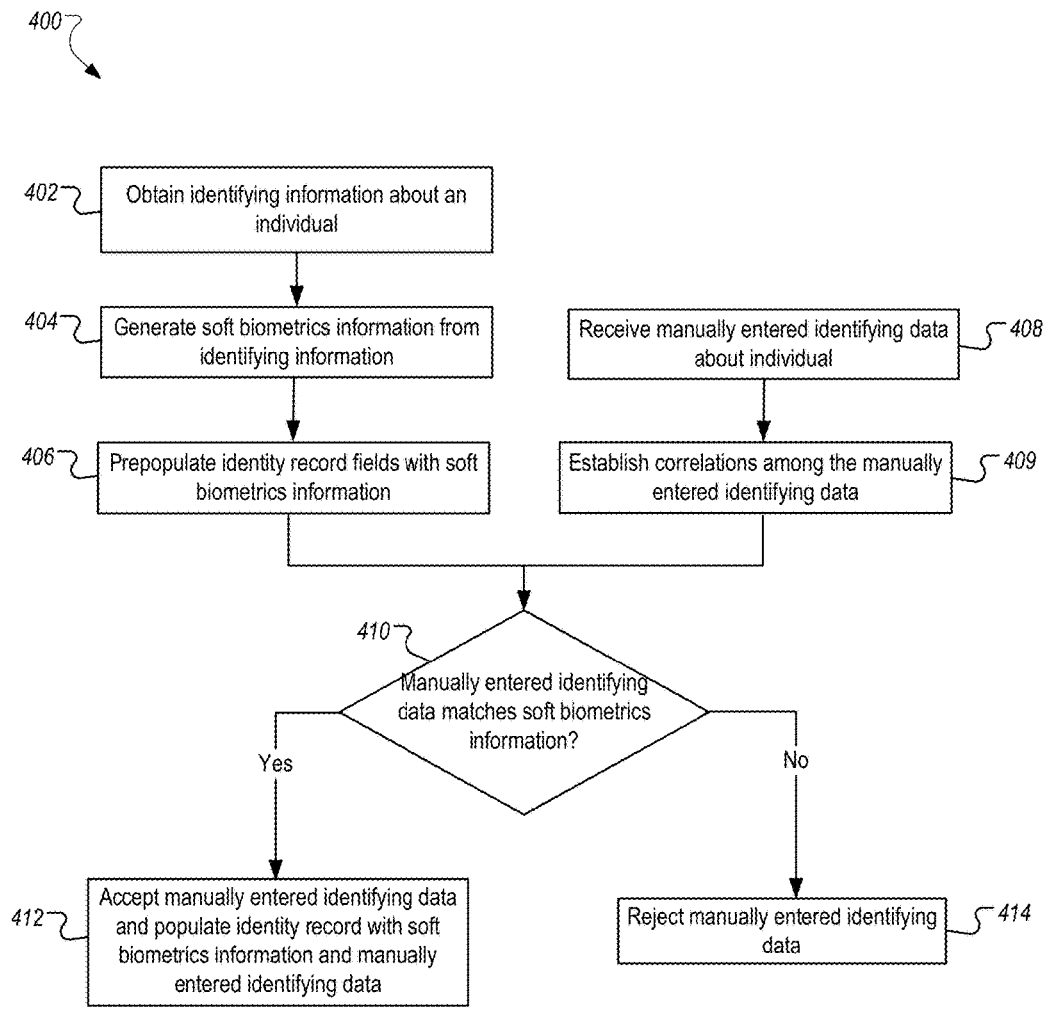
FIG. 4 illustrates an example process for using soft biometrics in an enrollment and verification system.

FIG. 4 illustrates an example process 400 for using soft biometrics in an enrollment and verification system. In some implementations, the process 400 may be performed by the system 300 and correspond to the enrollment procedure 200. Accordingly, the following section describes the process 400 with respect to the system 300 and the enrollment procedure 200. However, the process 400 also may be performed by other systems.

In some implementations, the process 400 is performed by one or more processors included in the system 300 that execute instructions, e.g., instructions 314, to enroll users into the system, or to verify information about users. The one or more processors use data, such as biometric identifiers, demographic information, soft biometrics information and identity records, which are stored in the database 312.

The process 400 starts by obtaining identifying information about an individual (402). For example, the feature acquisition module 304 may capture an image of a user, such as image 232.

Soft biometrics information is generated from the identifying information (404). For example, the soft biometrics information extraction module 306 may extract soft biometrics information from the identifying information acquired by the feature acquisition module 304. As an example, the soft biometrics information extraction module 306 may extract soft biometrics information 236 from the image 232.

Identity record fields are prepopulated with soft biometrics information (406). For example, the demographic information recordation module 308 prepopulates demographic information fields in an identity record associated with the user with soft biometrics information about the user obtained from the module 306. For example, the demographic information recordation module 308 may prepopulate one or more fields corresponding to height, eye color, gender, ethnicity, hair color, age, or weight using the soft biometrics information 236.

Manually entered identifying data about the individual is received (408). For example, the user, or a supervising official as the case may be, may type in identifying information about the user, such as the user's name, date of birth, gender, ethnicity, etc. This identifying information may be received by the identifying information acquisition module 302. In some implementations, the identifying information acquisition module 302 also may receive biometric identifiers about the user, such as an iris scan 210 or a fingerprint 226, as described previously.

Correlations are established among the manually entered identifying data (409). For example, as noted previously, the identifying information acquisition module 302 may determine demographic characteristics from other information that is manually entered. For example, the user's gender, race and/or ethnicity may not be manually entered. However, the identifying information acquisition module 302 may use the name that is manually entered to estimate the user's gender, race and/or ethnicity, as described previously. Additionally or alternatively, the identifying information acquisition module 302 may compare the identifying data that are manually entered in the corresponding fields and determine whether the identifying data are consistent with one another. As an example, a manually entered identifying data, such as the user's name, may be correlated with another piece of identifying data, such as gender. The identifying information acquisition module 302 may determine whether the name is consistent with the gender. For example, the manually entered name may be a typically female name, such as Dolores. In such a case, the identifying information acquisition module 302 will determine whether the manually entered gender information indicates that the user is female. If there is a mismatch, in some implementations the identifying information acquisition module 302 will automatically correct the manually entered gender information. For example, the identifying information acquisition module 302 may change the gender information from male to female when the user name is a typically female name. In some implementations, the identifying information acquisition module 302 will prompt the user or the supervising official manually entering the information at 408 to enter the correct information.

The manually entered identifying data is compared to the soft biometrics information (410). For example, the decision module 316 may receive soft biometrics that are extracted by the soft biometrics information extraction module 306, such as the user's gender, age, ethnicity, among others. The decision module also may receive manually entered information about the same user characteristics that are obtained by the identifying information acquisition module 302. As described previously, some of these user characteristics, such as gender, may be estimated by the identifying information acquisition module 302 from other identifying information that is manually entered, such as the user's name. For each characteristic, the decision module 316 may compare the manually entered information to that estimated by the soft biometrics information extraction module 306 for the corresponding characteristic. For example, the decision module may compare the age, gender or ethnicity information that is manually entered to respectively the age, gender or ethnicity estimated from the soft biometrics.

If the manually entered identifying data matches the soft biometrics information, then the manually entered identifying data is accepted and an identity record of the user is populated with the soft biometrics information and the manually entered identifying data (412). For example, the demographic information recordation module 308 populates relevant fields in an identity record of the user with the soft biometrics information, such as one or more of fields corresponding to height, eye color, gender, ethnicity, hair color, age, or weight, among others. The demographic information recordation module 308 also adds the manually entered information to appropriate fields in the identity record, e.g., fields where soft biometrics are unsuitable or cannot be generated but require manual input, such as the user's name, date of birth, social security number, among others. As described previously, the demographic information recordation module 308 may generate the identity record of the user, e.g., during initial enrollment into the system 300, or update an existing identity record of the user, e.g., during a verification when the user attempts to access system resources at a time subsequent to the initial enrollment. Further, as noted previously, in some implementations, the demographic information recordation module 308 adds biometric identifiers, such as an iris template or a fingerprint of the user, to the identity record.

If the manually entered identifying data does not match the soft biometrics information, then the manually entered identifying data is rejected (414). For example, if the decision module 316 determines that the manually entered information for a characteristic, such as the user's gender or ethnicity, does not match corresponding estimated soft biometrics information, then the decision module 316 may control the demographic information recordation module 308 to reject the manually entered information. Instead, the decision module 316, or the demographic information recordation module 308, may generate an alert, e.g., to warn about potential errors in the manually entered information.

In this manner, the process 400 may extract soft biometrics information from a user's image, or a voice sample or video in some cases, and prepopulate demographic information in an identity record or template for the user. The process 400 also may use the soft biometrics information to verify manually entered identifying information about the user. Accordingly, the process 400 may expedite enrollment and/or verification of the user in the system, and also reduce errors during enrollment.

Figure 5:
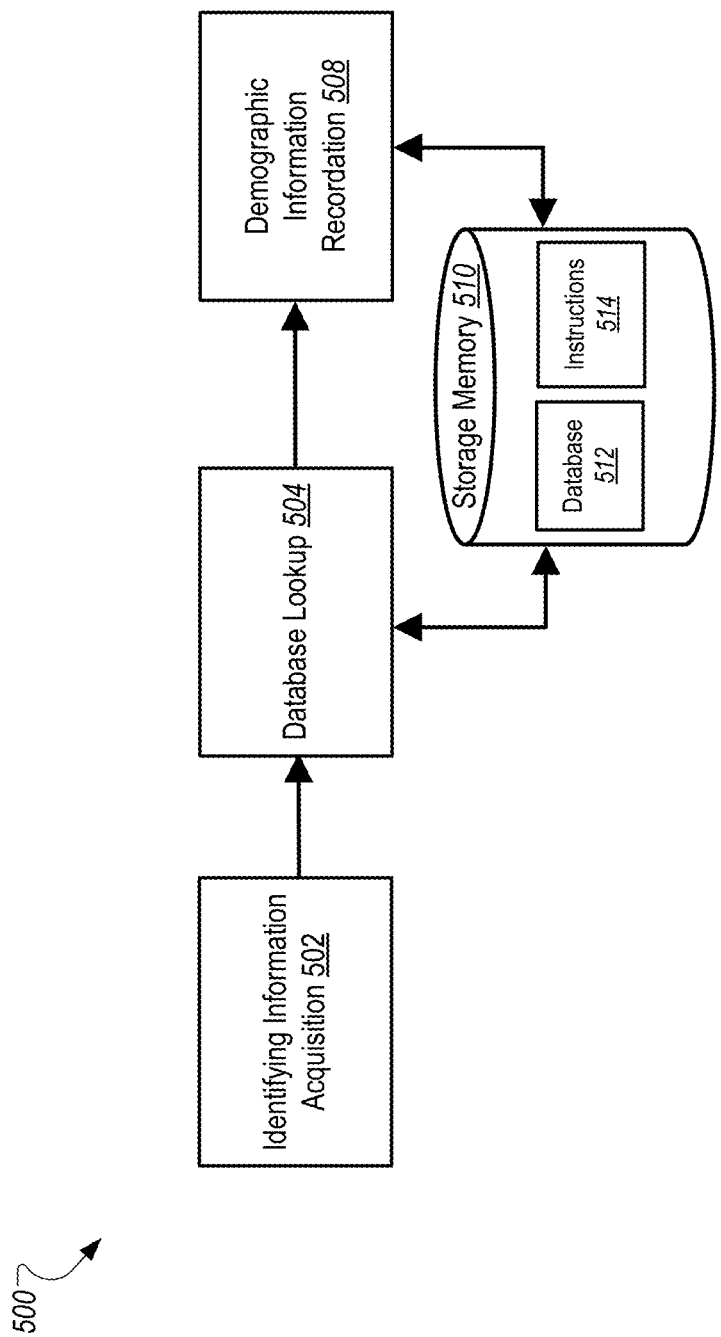
FIG. 5 illustrates a block diagram of an example system that uses biometric identifiers for obtaining demographic information about users.

In some implementations, biometric identifiers may be used for automatically populating demographic information into form fields, and/or verifying manually entered information. FIG. 5 illustrates a block diagram of an example system 500 that uses biometric identifiers for obtaining demographic information about users. In some implementations, the system 500 may be implemented as part of the system 300. However, in other implementations the system 500 may be a separate system.

In the example shown in FIG. 5, the system 500 includes an identifying information acquisition module 502, a database lookup module 504, a demographic information recordation module 508, and a storage memory 510. The storage memory includes a database 512 and instructions 514.

In some implementations, the system 500 may be implemented in a hardware device that incorporates all the modules shown in FIG. 5. For example, the system 500 may be a computer with a scanner, camera, or other optical input; a processor; a storage device; and input/output such as a keyboard, a mouse and a display. Alternatively, the system 500 may be a portable device (e.g., a smartphone) with a camera, a processor, on board memory, a touchscreen display that also provides input functionality, and/or additional input hardware (such as hardware buttons). In some implementations, the system 500 may include separate hardware components that are coupled to one another. For example, the system 500 may include a scanner, camera or other optical device, which is coupled to a computer with a processor, storage memory and a display. Other suitable configurations of the system 500 are also possible.

The identifying information acquisition module 502 is configured to obtain biometric identifiers of users. For example, the identifying information acquisition module 502 may obtain an iris scan 210 or a fingerprint 226 as described previously. The identifying information acquisition module 502 may include an optical component to obtain biometric identifiers, such as scanner or camera, or some other suitable hardware, to capture images of a user's iris or fingerprint. In some implementations, the identifying information acquisition module 502 may be similar to the identifying information acquisition module 302.

In some implementations, the identifying information acquisition module 502 may obtain one or more biometric identifiers of a user who has been previously enrolled into the system 500. In such cases, information about the user, such as the user's name, date of birth, age, ethnicity, gender, among others, may be previously stored in the system, e.g., in the database 512. In some implementations, the stored information may include biometric identifiers of the user, and/or soft biometrics information, which have been previously obtained. In some implementations, the user may have been enrolled using the system 300. This may be the case, for example, when the system 500 is a part of the system 300.

In some implementations, the identifying information acquisition module 502 also obtains manually entered identifying information about users. For example, the identifying information acquisition module 502 may be executed during a verification or enrollment update process. During the process, identity information about the user, such as the name, date of birth, social security or driver's license number, among others, may be manually entered, e.g., into a form, by the user or by a supervising official.

In some implementations, the information acquired by the identifying information acquisition module 502 is provided to a processor included in the system 500 for generating the corresponding biometric identifiers. For example, the processor may execute mathematical and statistical algorithmic routines to generate and store fingerprint 226 from an image of the finger 222, or a digital template of the user's iris from the iris scan 210. The information acquired by the identifying information acquisition module 502, and/or the resulting biometric identifiers that are generated, may be stored in the database 512.

In some implementations, the one or more biometric identifiers obtained by the identifying information acquisition module 502 are provided to a database lookup module 504. The database lookup module searches user records in the database 512 to find a record that includes biometric identifiers matching those presently obtained by the identifying information acquisition module 502. If there is a match, then the database lookup module 504 retrieves, from the database 512, the identifying information about the user that was previously stored, e.g., during a previous enrollment process.

The database lookup module 504 provides the identifying information about the user, which is retrieved from the database 512, to the demographic information recordation module 508. The latter extracts demographic information about the user from the identifying information, and populates relevant fields in an identity record of the user with the extracted demographic information. For example, the demographic information may include one or more of height, eye color, gender, ethnicity, hair color, age, or weight, among others. The demographic information recordation module 508 may populate corresponding demographic fields in an identity record with these data. In some implementations, the demographic information recordation module 508 may be similar to the demographic information recordation module 308.

In some implementations, the demographic information recordation module 508 generates the identity record. In other implementations, the demographic information recordation module 508 updates an existing identity record of the users. In some implementations, the demographic information recordation module 508 also adds manually entered information to the identity record. For example, as noted previously, the user's name, date of birth, social security number, etc. may be manually entered. The demographic information recordation module 308 may populate corresponding fields in the identity record with this manually entered information.

In some implementations, the demographic information recordation module 508 compares the demographic information that is extracted from the identifying information provided by the database lookup module 504 to the manually entered information. For example, the extracted demographic information may include the user's age, gender or ethnicity. These data also may be manually entered as noted above. For each such characteristic, the demographic information recordation module 508 may compare the manually entered information to extracted demographic information for the corresponding characteristic. For example, the demographic information recordation module 508 may compare the age, gender or ethnicity information that is manually entered to, respectively, the age, gender or ethnicity included in the extracted demographic information. If the manually entered information does not match the extracted demographic information, then the demographic information recordation module 508 may generate an alert, e.g., to warn about potential errors in the manually entered information.

In some implementations, the comparison may be performed by a decision module that is included in the system 500, which may be similar to the decision module 316. The decision module may be part of the demographic information recordation module 508, or it may be a separate module.

In some implementations, the identity records are stored in the database 512. In some implementations, the database 512 may be implemented in a storage memory 510, which may include read-only memory (ROM) and/or random access memory (RAM). Additionally or alternatively, the storage memory 510 may include flash memory, magnetic or optical memory, such as hard disk drives, computer disc or digital video disc memory (CD-ROM or DVD-ROM), among others. In some implementations, the storage memory 510 may be similar to the storage memory 310, while the database 512 may correspond to the database 312.

In some implementations, the storage memory 510 also may include instructions 514 that are executed by one or more processors associated with the system 500. The instructions 514 may encode routines corresponding to one or more of the identifying information acquisition module 502, the database lookup module 404 and the demographic information recordation module 508.

In some implementations, populating form fields and/or verifying manually entered information using demographic information biometric identifiers as described above may be performed in conjunction with using soft biometrics information. This may be the case, for example, when the system 500 includes modules similar to the feature acquisition module 304 and the soft biometrics information extraction module 306. Such modules may be configured to extract soft biometrics information from images, video, voice samples or other suitable features, as noted previously. This also may be the case, for example, when the system 500 is part of the system 300.

In such implementations, biometric identifiers may be used to retrieve identifying information about a user from the database 512 by performing a database lookup, e.g., by the database lookup module 504. The demographic information recordation module 508 may then extract demographic information about the user from the identifying information, and populate relevant fields in an identity record of the user with the extracted demographic information. The extracted demographic information may be checked against soft biometrics information that are determined by associated feature acquisition module and the soft biometrics information extraction module, e.g., as described previously with respect to the system 300. Additionally or alternatively, the soft biometrics may be used to verify manually entered information, as described previously.

Figure 6:
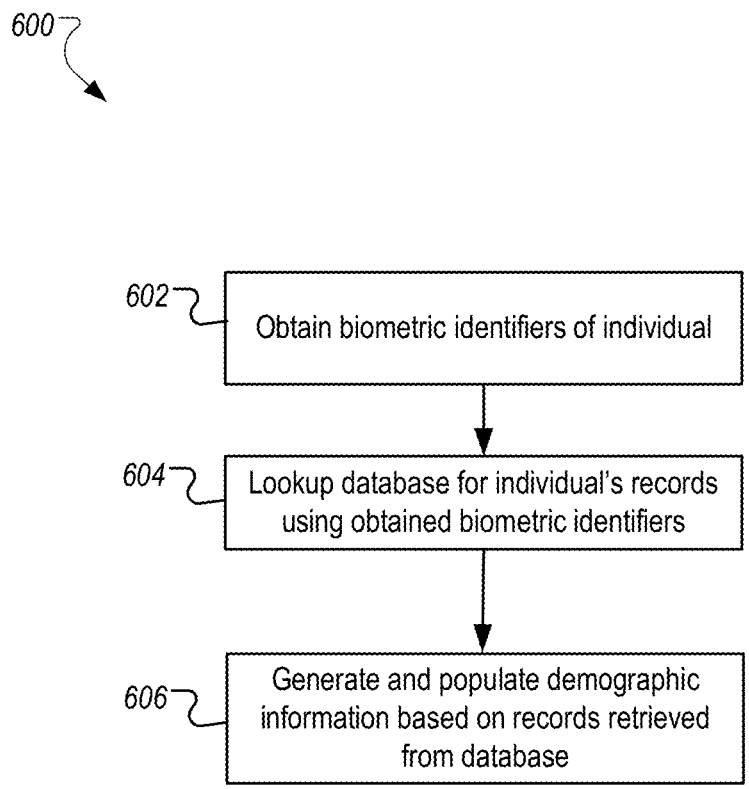
FIG. 6 illustrates an example process for using biometric identifiers to obtain demographic information about users.

FIG. 6 illustrates an example process 600 for using biometric identifiers to obtain demographic information about users. In some implementations, the process 600 may be performed by the system 500. Accordingly, the following section describes the process 600 with respect to the system 500. However, the process 600 also may be performed by other devices or system configurations.

In some implementations, the process 600 is performed by one or more processors included in the system 500 that execute instructions, e.g., instructions 514, to lookup identifying information about users from a database using obtained biometric identifiers and extracting demographic information from the identifying information. The one or more processors use data, such as the biometric identifiers and the identifying information that are stored in the database 512.

The process 600 starts by obtaining biometric identifiers of an individual (602). For example, the identifying information acquisition module 502 obtains one or more biometric identifiers of a user, such as an iris scan 210 or a fingerprint 226, as described previously. The obtained biometric identifiers may be forwarded to the database lookup module 504 to perform a database lookup. Additionally or alternatively, the biometric identifiers may be stored in the storage memory 530, e.g., in the database 512, for later processing.

A database lookup is performed using the obtained biometric identifiers for the individual's records (604). For example, the database lookup module 504 searches user records in the database 512 to find a record associated with biometric identifiers that match those received from the identifying information acquisition module 502. If a match is successfully found, then the database lookup module 504 retrieves, from the database 512, the identifying information about the user, which was previously stored, e.g., during a previous enrollment process. The database lookup module 504 provides the identifying information to the demographic information recordation module 508.

Demographic information is generated and populated based on records retrieved from the database (606). For example, the demographic information recordation module 508 extracts demographic information about the user from the identifying information provided by the database lookup module 504, and populates relevant fields in an identity record of the user with the extracted demographic information.

As described previously, in some implementations, the demographic information recordation module 508 adds manually entered information to the identity record. In some implementations, the demographic information recordation module 508 compares the demographic information that is extracted from the identifying information provided by the database lookup module 504 to the manually entered information. If the manually entered information does not match the extracted demographic information, then the demographic information recordation module 508 may generate an alert, e.g., to warn about potential errors in the manually entered information.

In this manner, the process 600 may obtain biometric identifiers of a user and retrieve identifying information about the user from a database by looking up stored records using the obtained biometric identifiers. The process 600 may extract demographic information about the user from the retrieved identifying information, and automatically populate form fields in an identity record using the demographic information. In some implementations, the process 600 may verify manually entered data by comparing with the demographic information. Accordingly, the process 600 may expedite enrollment and/or verification of the user in the system, and also reduce errors during the enrollment or verification.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   obtaining, using an optical computing device, identifying information about an individual;
   generating, using the identifying information and the optical computing device, soft biometrics information about the individual;
   receiving manually entered identity data about the individual;
   determining, using a hardware enrollment system, whether the manually entered identity data corresponds to the soft biometrics information, wherein the soft biometrics information represents biometric characteristics of the individual without uniquely identifying the individual;
   based on a determination that the manually entered identity data corresponds to the soft biometrics information, accepting the manually entered identity data; and
   populating, using the hardware enrollment system, an identity record associated with the individual with the soft biometrics information, wherein populating the identity record includes storing the soft biometrics information and the manually entered identity data in the identity record associated with the individual.

2. The method of claim 1, further comprising:
   receiving manually entered identity data about the individual;
   determining whether the manually entered identity data corresponds to the soft biometrics information; and
   based on a determination that the manually entered identity data does not correspond to the soft biometrics information, providing an alert to a user indicating that the manually entered identity data does not correspond to the soft biometrics information.

3. The method of claim 1, further comprising:
   receiving a biometric identifier associated with the individual, wherein receiving the biometric identifier includes one or more of performing a scan of a facial image of an individual, performing a scan of an eye of the individual, or performing a scan of a fingerprint of the individual.

4. The method of claim 3, further comprising:
retrieving, from a database, an identity record that corresponds to the biometric identifier;
comparing the information included in the identity record to the soft biometrics information; and
based on the comparison, determining whether the identity record matches the soft biometrics information.

5. The method of claim 4, further comprising:
updating the identity record with the soft biometrics information.

6. The method of claim 1, wherein obtaining identifying information about the individual comprises obtaining an image of the individual.

7. The method of claim 1, wherein obtaining identifying information about the individual comprises obtaining a voice sample of the individual.

8. The method of claim 1, wherein the identifying information about the individual includes one of a name of the individual or an address of the individual, and wherein generating the soft biometrics information about the individual comprises:
determining one or more of a gender, a race, an ethnicity or an age of the individual based on the name or the address of the individual.

9. The method of claim 1, wherein generating the soft biometrics information about the individual comprises:
automatically extracting soft biometrics information about the individual from the obtained identifying information using one or more algorithms that employ feature estimation based on matching scores.

10. The method of claim 1, wherein generating the soft biometrics information comprises determining, from the obtained identifying information, one or more of demographic or physical characteristics of the individual.

11. The method of claim 10, wherein the demographic or physical characteristics of the individual include one or more of gender, race, ethnicity, age, height, weight, eye color or hair color of the individual.

12. The method of claim 10, further comprising:
receiving manually entered identity data about the individual;
obtaining demographic or physical characteristics of the individual from the manually entered identity data;
correlating the demographic or physical characteristics obtained from the manually entered data; and
determining whether the demographic or physical characteristics obtained from the manually entered data match the demographic or physical characteristics determined from the identifying information.

13. A method comprising:
obtaining, using an optical computing device, biometric information about an individual;
using the biometric information to retrieve, from a database of a hardware enrollment system, identifying information that corresponds to the biometric information;
generating, using the identifying information, soft biometrics information about the individual, wherein the soft biometrics represent biometric characteristics of the individual without uniquely identifying the individual;

extracting, using the hardware enrollment system, demographic information from the identifying information;
obtaining manually entered data about the individual;
determining, using the hardware enrollment system, whether the demographic information corresponds to the manually entered data and the soft biometrics information; and
based on a determination that the demographic information corresponds to the manually entered data and the soft biometrics information, populating, using the hardware enrollment system, an identity record associated with the individual with the demographic information extracted from the identifying information and the manually entered data.

14. The method of claim 13, further comprising:
based on a determination that the demographic information does not correspond to the manually entered data, generating an error condition.

15. The method of claim 13, wherein obtaining the biometric information about the individual comprises obtaining biometric information based on one or more of performing a scan of a facial image of an individual, performing a scan of an eye of the individual, or performing a scan of a fingerprint of the individual.

16. The method of claim 13, further comprising:
updating the identity record with the soft biometrics information.

17. The method of claim 13, wherein obtaining the identifying information about the individual comprises:
obtaining additional identifying information by one or more of obtaining an image of the individual, or obtaining a voice sample of the individual.

18. The method of claim 17, wherein generating the soft biometrics information about the individual comprises:
automatically extracting soft biometrics information about the individual from the additional identifying information using one or more algorithms that employ feature estimation based on matching scores.

19. The method of claim 17, wherein generating the soft biometrics information comprises determining, from the additional identifying information, one or more of demographic or physical characteristics of the individual.

20. The method of claim 19, wherein the demographic or physical characteristics of the individual include one or more of gender, race, ethnicity, age, height, weight, eye color or hair color of the individual.

21. The method of claim 17, wherein determining whether the demographic information corresponds to the soft biometrics information comprises:
obtaining demographic or physical characteristics of the individual from the identifying information retrieved from the database; and
determining whether the demographic or physical characteristics obtained from the identifying information retrieved from the database match the demographic or physical characteristics determined from the additional identifying information.

22. The method of claim 13, wherein the identifying information about the individual includes one of a name of the individual or an address of the individual, and wherein extracting the demographic information comprises:
determining one or more of a gender, a race, an ethnicity or an age of the individual based on the name or the address of the individual.

* * * * *